United States Patent
Addink et al.

(10) Patent No.: US 6,714,134 B2
(45) Date of Patent: Mar. 30, 2004

(54) DETECTING WEATHER SENSOR MALFUNCTIONS

(75) Inventors: John Addink, Riverside, CA (US); Tony Givargis, Anaheim Hills, CA (US)

(73) Assignee: Aqua Conservation Systems, Inc., Riverside, CA (US)

( * ) Notice: Subject to any disclaimer, the term of this patent is extended or adjusted under 35 U.S.C. 154(b) by 24 days.

(21) Appl. No.: 09/764,033

(22) Filed: Jan. 16, 2001

(65) Prior Publication Data

US 2002/0092965 A1 Jul. 18, 2002

(51) Int. Cl.[7] .................................................. G01W 1/00
(52) U.S. Cl. ...................... 340/601; 73/170.18; 340/506
(58) Field of Search ............................ 342/357, 13, 26, 342/357.06; 250/369, 252.1, 372, 250, 573, 341.7, 203.4, 216, 214 R, 203.1, 208.2; 340/600–607; 280/203.4, 203.6, 238, 573; 702/3; 349/506, 514

(56) References Cited

U.S. PATENT DOCUMENTS

| | | | | | |
|---|---|---|---|---|---|
| 5,479,339 | A | * | 12/1995 | Miller | 700/16 |
| 5,978,738 | A | * | 11/1999 | Brown | 702/3 |
| 6,177,873 | B1 | * | 1/2001 | Cragun | 340/601 |
| 6,542,825 | B2 | * | 4/2003 | Jones et al. | 702/3 |
| 6,597,990 | B2 | * | 7/2003 | Brown | 702/3 |

FOREIGN PATENT DOCUMENTS

JP 11258358 A * 9/1999 .......... G01W/1/02

* cited by examiner

*Primary Examiner*—David Porta
*Assistant Examiner*—Patrick J. Lee
(74) *Attorney, Agent, or Firm*—Rutan & Tucker

(57) ABSTRACT

The present invention provides a warning system comprising: a weather measuring device that measures a current weather condition; and a storage device that stores historical weather data; a microprocessor that is programmed to receive the current weather data from the weather measuring device, compare the current weather data to the historical weather data, generate a warning signal if the current weather data varies from the historical weather data by at least a given amount, and send the warning signal to an individual.

14 Claims, 1 Drawing Sheet

DETECTING WEATHER SENSOR MALFUNCTIONS

FIELD OF THE INVENTION

The field of the invention is sensors.

BACKGROUND OF THE INVENTION

Weather stations provide information that impact many areas of an individual's life. Individuals may vary their play, work, and other activities based on a weather forecast. Therefore, it is advantageous that the weather stations base their forecasts on reliable data. To insure that data received from the weather station sensors are accurate most weather stations follow a regular maintenance program on their sensors.

In addition to television, radio, etc. organizations that own weather stations or have access to weather station data and broadcast weather information to consumers, there are many individuals and independent organizations that acquire weather stations or weather station components for their own use. Some of these individuals and independent organizations follow a regular sensor maintenance program recommended by the manufacturer whereas others are not quite as conscientious. They may only check their sensors sporadically, even though the information they receive from the weather sensors may have a significant impact on their productivity, income generation, etc. Therefore, a need exists for some mechanism that warns individuals when there is a potential error in the sensor data that they are basing their decisions on.

SUMMARY OF THE INVENTION

The present invention provides a warning system comprising: a weather measuring device that measures a current weather condition; a storage device that stores historical weather data; and a microprocessor that is programmed to receive the current weather data from the weather measuring device, compare the current weather data to the historical weather data, generate a warning signal if the current weather data varies from the historical weather data by at least a given amount indicative of a measurement malfunction, and send the warning signal to an individual.

The weather measuring device advantageously comprises one or more of a solar radiation sensor, a temperature sensor, an anemometer, an ultraviolet sensor and any other weather sensor or device that measures weather factors.

Preferably the storage device that stores historical weather data comprises a non-volatile memory.

In a preferred embodiment the storage device and microprocessor are disposed in an irrigation controller. Alternatively, the storage device and microprocessor may be disposed in a personal computer or in another suitable device.

The microprocessor may be located either local or distal to the weather measuring device(s). Furthermore, the microprocessor may receive the current weather data from the weather measuring device(s) via a communicative coupling that may either be a hardwire link or a wireless link.

As mentioned above, the microprocessor compares the current weather data to the historical weather data and generates a warning signal, if the current weather data differs from the historical weather data by a given amount. The amount may be a percentage, a number, a threshold or any other suitable term that designates a difference between the current weather data and the historical weather data. Furthermore, the given amount may vary with the different weather measuring devices.

The warning signal that is generated may be an audible alarm, a flashing display, microprocessor generated information with highlighted current weather measurements and historical weather measurements, and other warning methods.

In a preferred embodiment the microprocessor sends the warning signal to the weather measuring device operator. Alternatively, the warning may be sent to any individual that has an interest in the accuracy of the weather measuring device data. The warning may be sent to the individual via a telephone system, a radio system, a pager system or any other suitable communication system.

Various objects, features, aspects, and advantages of the present invention will become more apparent from the following detailed description of preferred embodiments of the invention, along with the accompanying drawings in which like numerals represent like components.

DETAILED DESCRIPTION

Figure 1:
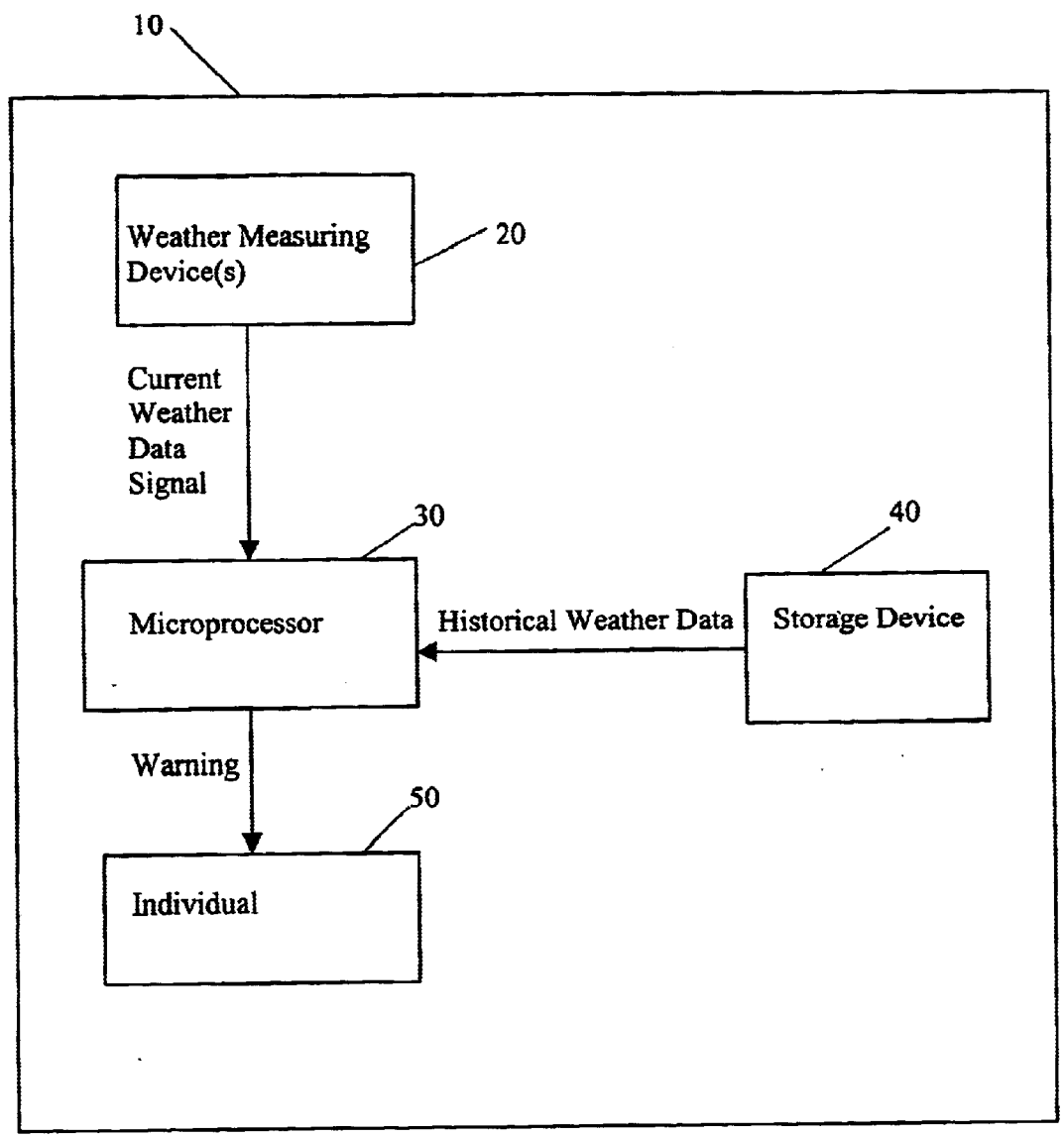
FIG. 1 is a block diagram of a warning system according to an aspect of the present invention.

In FIG. 1 is a block diagram of a warning system 10 that includes the following: at least one weather measuring device 20 that measures a current weather condition; a storage device 40 that stores historical weather data; and a microprocessor 30 that is programmed to receive the current weather data signal from the weather measuring device(s) 20, compare the current weather data to the historical weather data, generate a warning signal if the current weather data varies from the historical weather data by at least a given amount indicative of a measurement malfunction, and send the warning signal to an individual 50.

As used herein, the term "local" means less than or equal to one kilometer, and the term "distal" means greater than one kilometer. Also as used herein, the term "historical" includes data that occurred greater than 24 hours before the present time, while the term "current" includes data that occurred within 24 hours of the present time.

The weather measuring device 20 advantageously comprises one or more of a solar radiation sensor, a temperature sensor, an ultra violet sensor, a leaf wetness sensor, a humidity sensor, an anemometer, and any other weather sensor or device that measures weather factors. The microprocessor may be located either local or distal to the weather measuring device(s). The microprocessor receives the current weather information from the weather measuring device(s) 20 via a communicative coupling. Preferably the communicative coupling comprises a direct hardwire connection between the microprocessor 30 and the weather measuring device(s) 20 but the communicative coupling may be a wireless link, such as optical, radio, hydraulic or ultrasonic. Alternatively, the information from the weather measuring device(s) 20 may be manually inputted into the microprocessor 30. If the microprocessor 30 is located distal to the weather measuring device(s) 20, the distal signals may be transmitted via a telephone line, radio, pager, two-way pager, cable, and/or any other suitable communication mechanism.

The data received by the microprocessor 30 from the above listed weather measuring devices is preferably closely indicative of weather measurements and may, for example, include digital, analog, pulse, or binary data. It is contemplated that the data is unprocessed data except for formatting changes such as conversion from analog to digital, inclusion of appropriate signals to conform to parallel or serial transmission standards, and so forth.

In a preferred embodiment the microprocessor 30 receives historical weather information from the storage device 40. It is contemplated that the storage device 40 comprises a nonvolatile memory. Preferably the historical weather data averages from at least 10 years of data but historical weather data from shorter time spans such as five years, two years or even a single year, may also be used. Additionally, the historical weather data is preferably from a site with similar meteorological conditions as to the site where the weather measuring device(s) are located. The historical weather data may be obtained from a number of sources including government managed weather stations, radio stations, television stations, etc.

The storage device 40 and microprocessor can be related to each other in any reasonable manner. For example, both storage device and microprocessor may be disposed on the same board or chip, or in the same housing, such as a personal computer. Alternatively, the storage device and microprocessor may be disposed in separate housings, coupled by hard wiring, radio or other wireless mechanism, local area network, Internet, or in any other manner.

The microprocessor 30 is programmed to compare current weather data from the weather measuring device(s) 20 to historical weather data from a similar time period. The comparison may be as simple as determining whether the current weather data and historical weather data vary by a given amount, if that difference is indeed indicative of a measurement malfunction. The given amount of variation that will result in the generation of a warning may vary with the different weather measuring sensors. For example, if the difference between current and historical solar radiation data is 20% the microprocessor may be programmed to generate a warning. Whereas, with temperature data, the microprocessor might be programmed to generate a warning when the difference between the current and historical temperature data is 40%.

In more sophisticated embodiments it may be necessary to filter out variations that are not likely to comprise measurement malfunctions. For example, in geographical areas beset with hurricanes and tornados, a very large barometric pressure variation may be experienced over a period of only ten minutes or less. At some times of the year such variation may not indicate a measurement malfunction, but may instead indicate normal weather patterns. That determination would likely depend on computer interpretation of at least three parameters, namely historical data, current data, and some sort of analytical model. For such purposes an accurate assessment may require several years or more of historical data, combined perhaps with sets of current data extending over several hours. For other purposes, such as deep soil temperature variations, several years of data may be entirely unnecessary.

The analytical model may take into account many factors, including for example, first or second derivate changes such as the sharpness of increases or declines in weather measurements, as compared with historical declines or increases. Thus, for some measurements a relatively large, slow change may indicate a measurement malfunction, while for other measurements a relatively small, fast change may indicate a measurement malfunction. It should therefore be appreciated that the "amount" by which the current weather data must vary from the historical weather data to generate a warning signal may relate to something other than a percentage, including a number, a threshold, or any other suitable parameter that sufficiently designates a difference between the current weather data and the historical weather data.

In a preferred embodiment the microprocessor sends the warning to an individual 50. Advantageously, the individual 50 would comprise the weather measuring device operator. However, as used herein, the term "individual" may include all parties having an interest in the accuracy of the weather measuring device data. The warning may be sent via a telephone system, a radio system, a pager system, an Internet system or any other suitable communication system.

The warning may be through any suitable means, including, for example, a flashing display, an audible alarm, microprocessor generated information with highlighted actual weather measurements and historical weather measurements, and other warning methods.

Maintenance of some of these weather-measuring devices is more critical than of others. For example, the temperature sensor may require very little maintenance whereas the solar radiation sensor may require regular maintenance. One reason the solar radiation sensor may require regular maintenance is that there is a diffuser at the top of the solar radiation sensor and if dirt accumulates on the diffuser, this can affect the accuracy of the solar radiation sensor measurements. Therefore, the diffuser should be dusted regularly with a soft dry brush and when necessary cleaned with a damp cloth or cotton swab. However, even with a regular maintenance program there still may be times when there is some interference that prevents the sensors from providing an accurate weather measurement. A warning system 10, according to the present invention, warns the weather measuring device operator and/or other individuals 50 to check a sensor and if need be take corrective measures to insure an accurate measurement of the weather is obtained. When there is no regular sensor maintenance schedule, a warning system, such as that discussed herein is a necessity if accurate weather measurement data is desired.

Thus, specific embodiments and applications have been disclosed. It should be apparent, however, to those skilled in the art that many more modifications besides those described are possible without departing from the inventive concepts herein. The inventive subject matter, therefore, is not to be restricted except in the spirit of the appended claims.

What is claimed is:

1. A warning system comprising:

a weather measuring device that measures a current weather condition;

a storage device that stores historical weather data; and a microprocessor that is programmed to receive the current weather data from the weather measuring device, compare the current weather data to the historical weather data, generate a warning signal if the current weather data varies from the historical weather data by at least a given amount indicative of a weather measuring device malfunction, and send the warning signal to an individual.

2. The warning system of claim 1, wherein the weather measuring device comprises a solar radiation sensor.

3. The warning system of claim 1, wherein the weather measuring device comprises a temperature sensor.

4. The warning system of claim 1, wherein the storage device comprises a non-volatile memory.

5. The warning system of claim 1, wherein the storage device and microprocessor are disposed in an irrigation controller.

6. The warning system of claim 1, wherein the storage device and microprocessor are disposed in a personal computer.

7. The warning system of claim 1, wherein the weather measuring device is local to a site where the microprocessor is located.

8. The warning system of claim 1, wherein the weather measuring device is distal to a site where the microprocessor is located.

9. The warning system of claim 1, wherein the microprocessor is communicatively coupled to the weather measuring device.

10. The warning system of claim 9, wherein the communicative coupling comprises a wired connection.

11. The warning system of claim 9, wherein the communicative coupling comprises a wireless connection.

12. The warning system of claim 1, wherein the warning signal comprises an audible alarm.

13. The warning system of claim 1, wherein the amount comprises a percentage.

14. The warning system of claim 1, wherein the amount comprises a number.

* * * * *